(12) United States Patent
Falk et al.

(10) Patent No.: US 11,005,270 B2
(45) Date of Patent: May 11, 2021

(54) METHOD FOR OPERATING AN ISLAND SYSTEM, AND ISLAND SYSTEM

(71) Applicant: SMA Solar Technology AG, Niestetal (DE)

(72) Inventors: Andreas Falk, Kassel (DE); Christian Hardt, Kassel (DE); Neidhardt Bechtel, Kassel (DE); Dirk Hermeling, Petershagen (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/727,215

(22) Filed: Dec. 26, 2019

(65) Prior Publication Data

US 2020/0251909 A1    Aug. 6, 2020

Related U.S. Application Data

(63) Continuation of application No. PCT/EP2018/065894, filed on Jun. 14, 2018.

(30) Foreign Application Priority Data

Jun. 28, 2017 (DE) ..................... 10 2017 114 306.8

(51) Int. Cl.
*H02J 3/46* (2006.01)
*H02J 3/32* (2006.01)

(52) U.S. Cl.
CPC .................. *H02J 3/46* (2013.01); *H02J 3/32* (2013.01); *H02J 2300/26* (2020.01); *H02J 2300/28* (2020.01)

(58) Field of Classification Search
CPC .. H02J 3/46; H02J 3/32; H02J 2300/28; H02J 2300/26
See application file for complete search history.

(56) References Cited

U.S. PATENT DOCUMENTS

| | | |
|---|---|---|
| 2003/0039132 A1 | 2/2003 | Engler |
| 2015/0357820 A1 | 12/2015 | Sugimoto |
| 2015/0380942 A1 | 12/2015 | Premm |
| 2017/0187188 A1 | 6/2017 | Aubert Guyon |

FOREIGN PATENT DOCUMENTS

| | | |
|---|---|---|
| CA | 2950809 A1 | 5/2015 |
| DE | 102013218892 A1 | 3/2015 |
| DE | 102014108395 A1 | 12/2015 |

*Primary Examiner* — Robert L Deberadinis
(74) *Attorney, Agent, or Firm* — Eschweiler & Potashnik, LLC

(57) ABSTRACT

A method for operating an island system is disclosed. The island system includes a group of voltage-controlling converters, wherein each of the voltage-controlling converters of the group are configured to convert power of respectively connected regenerative power sources into AC power in accordance with a respective frequency-power characteristic curve. The island system also includes a load having a power consumption that depends on a voltage amplitude of an AC voltage of the island system, and a control unit that is configured to transmit a default value of the voltage amplitude to the group of voltage-controlling converters. The method adapts the power to be consumed by the load.

15 Claims, 6 Drawing Sheets

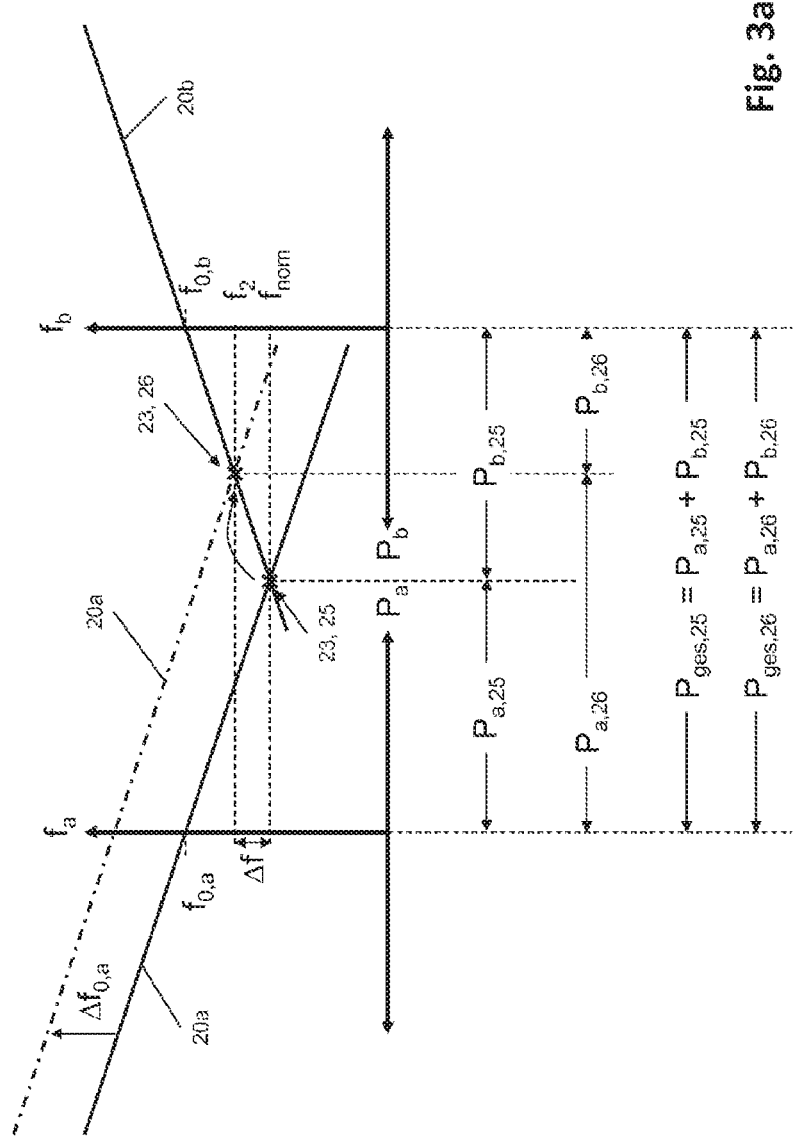

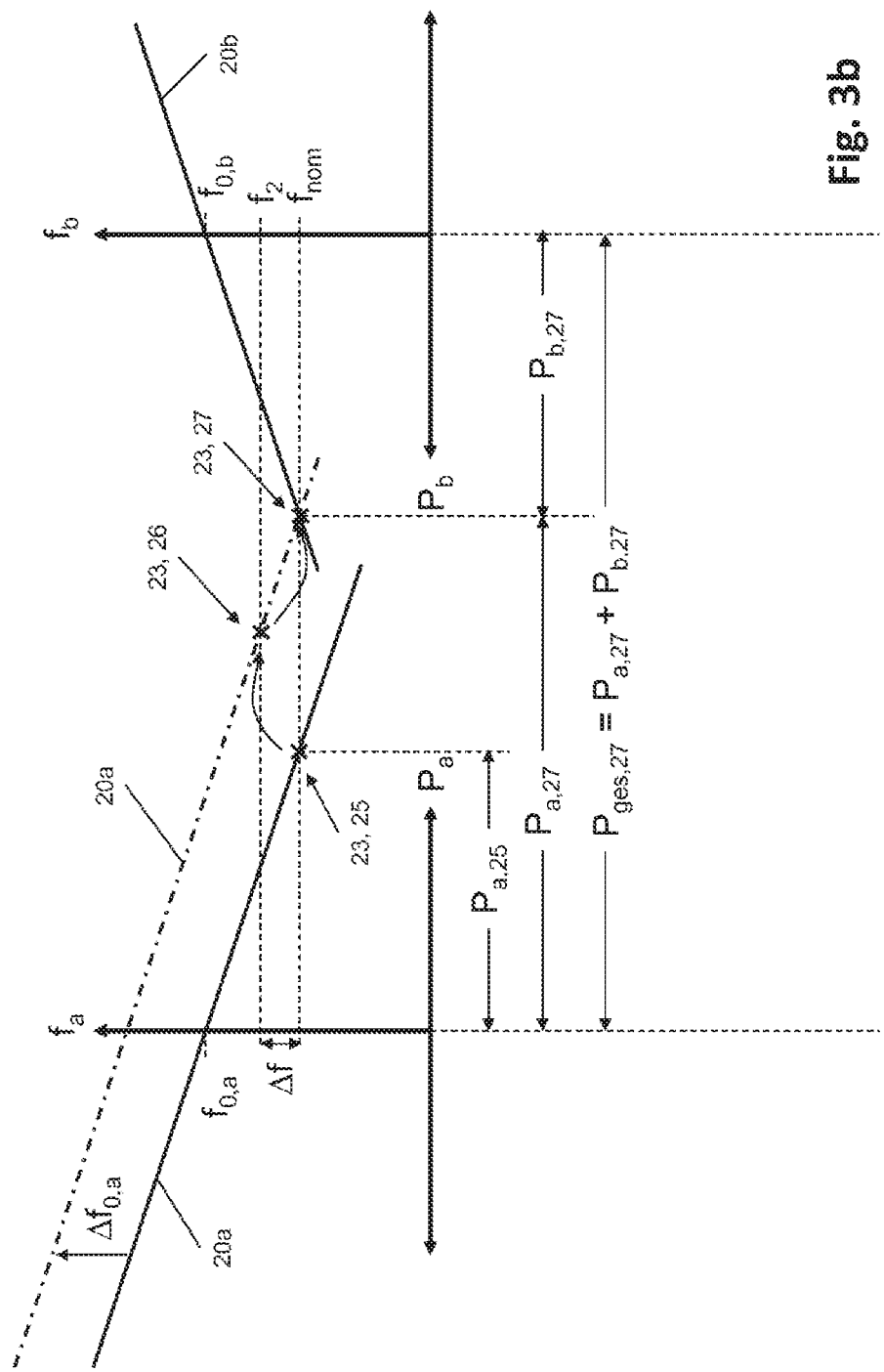

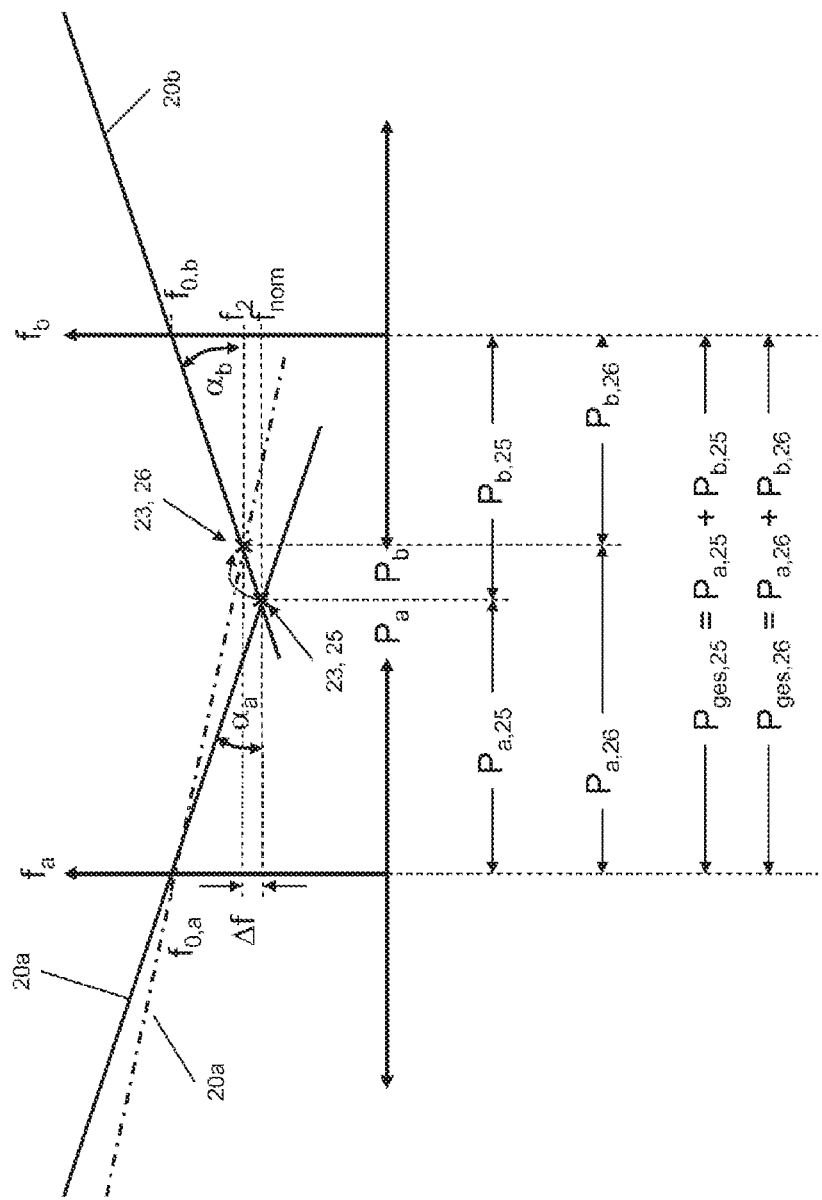

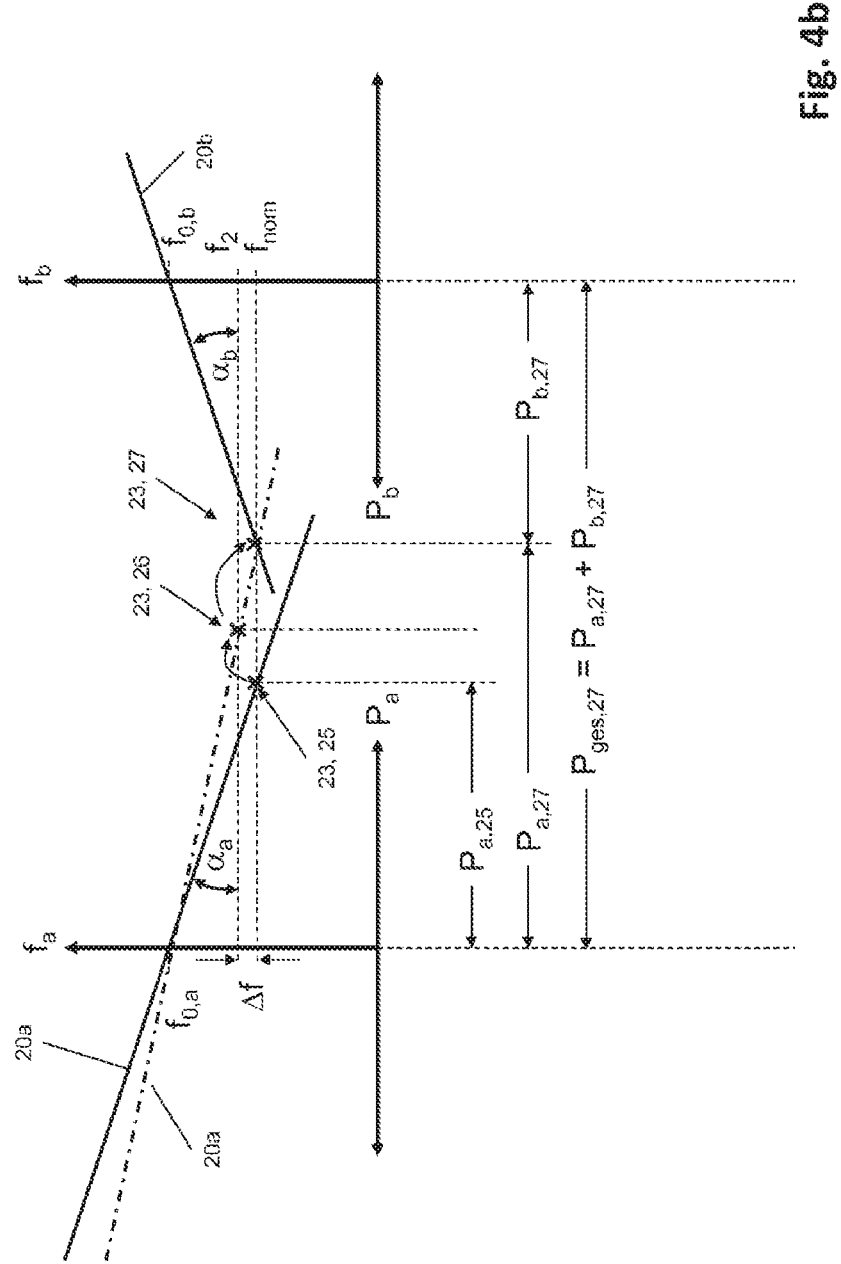

METHOD FOR OPERATING AN ISLAND SYSTEM, AND ISLAND SYSTEM

CROSS REFERENCE TO RELATED APPLICATIONS

This application is a continuation of International Patent Application number PCT/EP2018/065894, filed on Jun. 14, 2018, which claims priority to German Patent Application number 10 2017 114 306.8, filed on Jun. 28 2017, and is hereby incorporated by reference in its entirety.

FIELD

The disclosure relates to a method for operating an island system and an island system that is operated using such a method. In particular—but not exclusively—this relates to an island system in which electric power of a regenerative power generating unit is fed to an electrolyzer as a long-term energy store and load in the island system.

BACKGROUND

In island systems, power generating units are connected to one or more energy consumers via one or more AC conductors for transporting the power. Since the island system only has very restricted options for storing power, an equal balance of power produced by the power generating units on the one hand and power consumed by the energy consumers on the other hand should be maintained at all times. Here, an AC voltage frequency in the island system signals whether the balance is tending to shift in favor of a power consumer (frequency below the nominal frequency) or in favor of a power producer (frequency above the nominal frequency). The frequency serves as a measure for the direction in which the power balance has to be shifted—power production or power consumption—in order to counteract the tendentious balance shift. Here, a power production is usually regulated as a function of the respective power consumption in conventional island systems; i.e., the power consumption defines the power production.

However, in some island systems it is desirable not to regulate the power production as a function of the power consumption but, conversely, to regulate the power consumption as a function of the maximum power production currently available. This is particularly the case if the island system contains a regenerative power generating unit, whose produced power should be fed to a long-term store, for example an electrolyzer as a load. In this case, the object is that of always operating the power generating unit or units at the respectively available power where possible in order to store a maximum of this power in a suitable energy carrier (in this case: hydrogen).

The prior art has disclosed island systems with a regenerative power generating unit and an electrolyzer as a load. However, for the purposes of generating the AC voltage in the island system, these usually contain an energy store that has an operating point that is variable on a short-term basis, for example a battery, in addition to the long-term energy store operating as a load. This energy store that is variable on a short-term basis, simply referred to as energy store below, is connected to an AC conductor of the island system by way of a bidirectionally operable converter. It has the object of, firstly, controlling an AC voltage with a constant voltage amplitude in the island system and, secondly, equalizing the power flow to the load in the case of a possibly fluctuating power production of the regenerative power generating unit by charging or discharging. To this end, the converter associated with the energy store has a voltage controlling and bidirectional embodiment. Likewise, island systems are known, in which a diesel generator is provided in place of the energy store, said diesel generator adopting the object of the energy store and, firstly, equalizing an AC voltage with a constant voltage amplitude and, secondly, equalizing the power flow to the load by a corresponding change of a primary power supply (fuel in this case).

Therefore, a conventional island system always requires an energy store and/or a diesel generator as a grid former and buffer store for a possibly strongly fluctuating power of the regenerative power generating unit. This not only entails a considerable investment in procurement but also additionally entails costs during operation (e.g., fuel costs). Moreover, an additional component that may require much servicing is required, as a result of which the operation of the island system becomes complicated.

DE 10140783 A1 has disclosed an apparatus for equitable parallel operation of at least two inductively coupled inverters that take account of a preselected frequency droop and a preselected voltage droop.

Document CA 2950809 A1 discloses a method for automatic characteristic curve control of inverters of an island system. In the method, slopes of a frequency-power (f-P) characteristic curve and a voltage-reactive power (U-Q) characteristic curve of the inverters are actively varied in order to maintain a frequency and a voltage of the AC voltage in the island system without deviations, even in the case of a change in load. The method employs a small signal stability analysis for verifying an implementability of the actively modified characteristic curves.

EP 2940826 A1 discloses a power converter, the control method of which need not be changed when an operation of an island system, to which the power converter is connected together with other generating units, is changed from a voltage-controlling to a current-controlling operation.

EP 3185386 A1 discloses a method for controlling an island system comprising a renewable generating unit and a synchronous generator. The renewable generating unit is designed to transfer the first power in characteristic curve-controlled fashion to the island system and can be operated in parallel with a synchronous generator that transfers a second power to the island system. The synchronous generator is started when a frequency of the island system lies below a frequency threshold and/or a voltage of the island system lies below a voltage threshold. The synchronous generator is stopped when the second power lies below a power threshold.

SUMMARY

The disclosure is directed to a method for operating an island system comprising a load and at least one voltage-controlling converter, a regenerative power source being connected to the input thereof, wherein the power consumption of the load is controlled in such a way that a power generating unit comprising the voltage-controlling converter and the regenerative power source connected thereto is operated at the maximum available power where possible. Here, the method should be suitable for operating the island system even without a grid former in the form of a bidirectionally operable energy store or a diesel generator. The disclosure is further directed to an island system comprising such a method.

In a method according to the disclosure for operating an island system, the island system comprises a group of voltage-controlling converters configured to convert power of connected regenerative power sources into AC power in accordance with a frequency-power characteristic curve. The island system further comprises a load, the power consumption of which depends on a voltage amplitude $\hat{U}_0$ of an AC voltage of the island system, and a control unit that transmits a default value of the voltage amplitude $\hat{U}_0$ to the group of voltage-controlling converters. Here, the method comprises the following acts for adapting a power $P_{Last}$ to be consumed by the load. The method comprises modifying the frequency-power characteristic curve of the at least one converter as a function of an available power of the regenerative power source. The frequency-power characteristic curve is modified, at least in sections, to a higher frequency at a given power in order to check whether the available power of the regenerative power source lies above the current power. The frequency-power characteristic curve is modified, at least in sections, to a lower frequency at a given power if the regenerative power source cannot yield the power associated with the current frequency according to the frequency-power characteristic curve. The method also comprises determining, for example, detecting the frequency $f_2$ of the AC voltage in the island system as a consequence of the modification to the frequency-power characteristic curve by the control unit, optionally by means of a detection unit connected to the control unit, and predetermining a default value of the voltage amplitude $\hat{U}_0$ and transmitting the redetermined default value to the group of voltage-controlling converters by means of the control unit. The default value is increased, in order to increase a power consumption of the load, if the determined frequency $f_2$ lies above a nominal frequency $f_{nom}$ of the island system, and the default value is reduced, in order to decrease a power consumption of the load, if the determined frequency $f_2$ lies below the nominal frequency $f_{nom}$ of the island system.

In one embodiment, the load can be formed by an ohmic load with a linear current-voltage characteristic curve. However, as an alternative thereto, the load may also have a nonlinear current-voltage characteristic curve—for example, in the case of an electrolyzer. The control unit can be present in the form of a single separate control unit. However, as an alternative thereto, it can also be distributed among a plurality of control units. In this case, the individual control unit or the plurality of control units can be provided exclusively for the implementation of the method according to the disclosure. However, the control unit is able to adopt other control tasks, too, such as tasks within the scope of the operational control of a converter, and lies within the scope of the disclosure. Specifically, the control unit can also be distributed among a plurality of converters and be embodied there, in particular, as part of the controller of the individual converter in each case. For this case, the controller of a certain converter can operate as a master and the controllers of the other converters can operate as slaves. The modification of the frequency-power characteristic curve can be controlled by the control unit. The modification of the frequency-power characteristic curve can be coordinated by the control unit in the case of a plurality of voltage-controlling converters. However, this may alternatively also proceed without the coordination of the individual converters among themselves, autonomously in each individual converter as it were.

In contrast to the public power distribution grid, the voltage amplitude $\hat{U}_0$ of the AC voltage is not constant in the island system; instead, it is variable by the control unit. The variable voltage amplitude $\hat{U}_0$ is used within the scope of the method to adjust a power $P_{Last}$ consumed by the load. In conjunction with the power source connected at the input side, each of the voltage-controlling converters connected to the island system checks whether it can supply more power than is currently produced. To this end, its frequency-power characteristic curve is initially shifted, at least in sections, to higher frequency at the same power. In the case of a plurality of converters, the operating points of all converters shift among one another in such a way as a result thereof that the converter whose frequency-power characteristic curve is shifted to a higher frequency supplies more power, provided the power source thereof comprises more power, while the other converters supply slightly less power in accordance with the frequency-power characteristic curve thereof. Initially, this yields an unchanged overall power, albeit with different partial powers of the individual converters. However, the overall power is now transported in the island system at a higher frequency. This higher frequency is measured by way of the control unit, optionally with the aid of a detection unit, and interpreted as a signal that more power can be transported to the load. In order to increase the power consumption of the load, a new default value of the voltage amplitude $\hat{U}_0$ is transmitted to the converters by the control unit. By virtue of the converters now controlling an AC voltage with a higher voltage amplitude $\hat{U}_0$, the power consumed by the load increases. If the converter in conjunction with the connected power source cannot stably yield the power according to its frequency-power characteristic curve, this is identified, for example, by power measurements at the input and output of the converter, or by a detection of a voltage across a DC link circuit associated with the converter. In reaction thereto, the frequency-power characteristic curve of the relevant converter is shifted, at least in sections, to a lower frequency at the same power. This also reduces the power flowing through the converter while the other converters supply slightly more power such that, initially, an unchanged overall power is supplied, albeit with different partial powers of the individual converters. However, the overall power is transported in the island system at a lower frequency. Similar to what was explained before, the low frequency is now detected by the control unit and interpreted as a signal to reduce the power consumed by the load. Therefore, accordingly, a lower default value of the voltage amplitude $\hat{U}_0$ is transmitted to the group of voltage-controlling converters. The method explained above using the example of a plurality of voltage-controlling converters connected to the island system can also be transferred to a single voltage-controlling converter connected to the island system. Therefore it should be appreciated that in the present disclosure a "group" of voltage-controlling converters means "one or more" voltage-controlling converters. The only difference arising is that no immediate change in the power flowing through the converter accompanies the change in the frequency-power characteristic curve in the case of a single voltage-controlling converter connected to the island system. Rather, said power only changes once the control unit transmits a new default value for the voltage amplitude $\hat{U}_0$ to the single converter on account of the frequency change directly arising by the modification of the characteristic curve.

Within the island system, the method uses AC coupling between the at least one power generator and the load. An AC transmission path is generally significantly more cost-effective than a DC transmission path to be designed accordingly—in particular when taking account of the distance between the power sources and the load. In many cases, an AC transmission path present in any case can even be used within the scope of the method. By virtue of the regenerative power sources now according to the disclosure operating as grid formers in conjunction with the converters, it is possible to dispense with keeping energy stores or diesel generators available as grid formers. As a result of this, the outlay of the island system, both in terms of procurement and operation, can be minimized.

In an advantageous embodiment of the disclosure, a check is carried out prior to increasing the default value of the voltage amplitude $\hat{U}_0$ as to whether the power $P_a$, $P_b$ flowing through the at least one converter exceeds, or threatens to exceed, a power limit $P_{max,a}$, $P_{max,b}$ of the corresponding converter. As an alternative or in addition thereto, a check is carried out as to whether the consumption $P_{Last}$ of the load exceeds, or threatens to exceed, a maximum admissible consumption $P_{max,Last}$ of the load. Following the check or checks, the default value of the voltage amplitude $\hat{U}_0$ is not increased if the power limit $P_{max,a}$, $P_{max,b}$ of the corresponding converter or the maximum admissible consumption $P_{max,Last}$ of the load is exceeded with an increased default value of the voltage amplitude $\hat{U}_0$. This can avoid overdriving of the at least one converter and/or the load in advance.

In one embodiment, there is a check as to whether the regenerative power source can yield the power associated with the current frequency according to the frequency-power characteristic curve in such a way that a voltage value at a DC link circuit associated with the corresponding converter is measured. In this way, a voltage measurement present at the DC link circuit in any case can be used to this end. In this case, if the measured voltage value drops below a voltage threshold, this drop signals that the regenerative power source is unable to yield the power associated with the current frequency according to the frequency-power characteristic curve. Being unable to yield a power associated with the frequency-power characteristic curve at the current frequency need not necessarily be a result of the power source not having this power available. Instead, it is also possible that the assembly of power source and converter cannot yield the required power on account of the power limit $P_{max,a}$, $P_{max,b}$ of the corresponding converter being reached. Here, the power limit $P_{max,a}$, $P_{max,b}$ of the corresponding converter can be ascertained on the basis of maximum permitted current and/or voltage values—which possibly depend on temperature—of the converter. In one embodiment of the method, values of the power limit $P_{max,a}$, $P_{max,b}$ of the converter, of the regenerative power source associated with the converter and/or of the maximum admissible consumption $P_{max,Last}$ of the load are known, at least approximately. In this case, the power to be consumed by the load can be adapted in such a way that the power $P_a$, $P_b$ flowing through the at least one converter lies by at least one preset tolerance value below the power limit $P_{max,a}$, $P_{max,b}$ of the corresponding converter and/or of the regenerative power source associated with the converter. As an alternative or in addition thereto, the power to be consumed by the load can be adapted in such a way that a consumption $P_{Last}$ of the load lies by at least one preset tolerance value below the maximum admissible consumption $P_{max,Last}$ of the load. In this way, it is always possible to keep available at a certain positive control margin of the power generating units made of converter and power source. This can preclude a power generating unit, on account of the modification of the frequency-power characteristic curve of another converter, from being maneuvered into a state where the power generating units are unable to yield the required power. This makes the method particularly robust.

In one embodiment of the method, the modification of the frequency-power characteristic curve includes a parallel displacement of at least one section of the frequency-power characteristic curve in the direction of the frequency axis. Here, the frequency-power characteristic curve can be formed, in principle, by any function—advantageously any monotonic function. The scope of the disclosure includes the frequency-power characteristic curve being described by a straight line in at least one section. In this case, the change in the frequency-power characteristic curve can include a change in the straight-line slope in the relevant section.

In one embodiment of the method, the group contains not only a single voltage-controlling converter but a multiplicity of voltage-controlling converters, which are each configured to convert power of connected regenerative power sources into AC power in accordance with a frequency-power characteristic curve, wherein the modification of the frequency-power characteristic curve as a function of the available power of the power source associated with the converter is implemented for each individual converter. Here, modifying the frequency-power characteristic curve—for example by the control unit—can be implemented in coordinated fashion in the plurality of converters within the group. However, this is not mandatory and can also be implemented in an uncoordinated manner among one another, as it were autonomously within each individual converter. This can minimize the tasks of the control unit, as a result of which the latter becomes more cost-effective.

In an advantageous variant of the method, the acts for modifying the power $P_{Last}$ to be consumed by the load are run through repeatedly in order to track a change of the maximum available power of the regenerative power source or of a power limit $P_{max,a}$, $P_{max,b}$ of the corresponding converter over time.

An island system according to the disclosure comprises a group of at least one voltage-controlling converter having a DC/AC converting module, the input of said converter being connected to a regenerative power source and the output thereof being connected to an AC conductor of the island system. Here, the converter is configured to control an AC voltage in the island system as a function of a frequency-power characteristic curve associated with the converter. The island system furthermore comprises a load, the power consumption of which depends on a voltage amplitude $\hat{U}_0$ of the AC voltage in the island system, and a control unit configured to control the group of the at least one voltage-controlling converter. The control unit is configured to transfer to the group a default value of the voltage amplitude $\hat{U}_0$ for the AC voltage of the island system. The island system also comprises a detection unit configured to determine, for example, to detect, a frequency $f_2$ of the AC voltage in the island system, wherein the detection unit is connected to the control unit. Here, the control unit is configured to carry out the method according to the disclosure in conjunction with the group of the at least one converter and the regenerative power source connected to the converter. The advantages already explained in conjunction with the method arise.

In one embodiment of the island system, at least one converter of the group in conjunction with the regenerative power source connected to the converter is embodied as a photovoltaic (PV) system or as a wind power system. In principle, however, the converters may also be connected to other regenerative power sources. Thus, the converter in conjunction with the power source can also form a hydroelectric power system or a tidal power system.

In an advantageous embodiment, the island system comprises a high-voltage transmission path with a high-voltage conductor, which is connected by way of a transformer to the AC conductor of the island system. Advantageously, the high-voltage transmission path is connected at both of its two ends to the AC conductor of the island system by way of a transformer such that these connect the group of voltage-controlling converters including the regenerative power sources connected thereto to the load. A given electric power can be transported along the high-voltage transmission path with less material outlay in terms of cabling. The additionally required transformers are overcompensated, and hence amortized, beyond a certain distance between the power generating unit and load as a result of the lower material outlay in terms of cabling.

The load in the island system can be formed by an AC load. In one embodiment of the island system, however, the load is embodied as a DC load, in particular as an electrolyzer. Here, the DC load/electrolyzer is connected via an AC/DC converting module to the AC conductor of the island system. To the extent that the island system comprises a high-voltage transfer path, the DC load/electrolyzer is connected to the high-voltage conductor of the island system by way of a transformer. In one embodiment, the island system can have a storage unit, which is connected to the AC conductor of the island system by way of a bidirectionally operable DC/AC converting module. To this end, the bidirectionally operable DC/AC converting module need not necessarily be a voltage controlling DC/AC converting module. Rather, it is sufficient for the DC/AC converting module to have a current controlling embodiment.

BRIEF DESCRIPTION OF THE FIGURES

The disclosure will be described and explained in more detail below on the basis of preferred exemplary embodiments that are illustrated in the figures.

FIGS. 3a & 3b show an embodiment of the method, in which the frequency-power characteristic curve is modified by way of a shift parallel to the frequency axis; and FIGS. 4a & 4b show a further embodiment of the method, in which the frequency-power characteristic curve is described by a straight line and the frequency-power characteristic curve is modified by way of a change in the straight-line slope.

DETAILED DESCRIPTION

Figure 1:
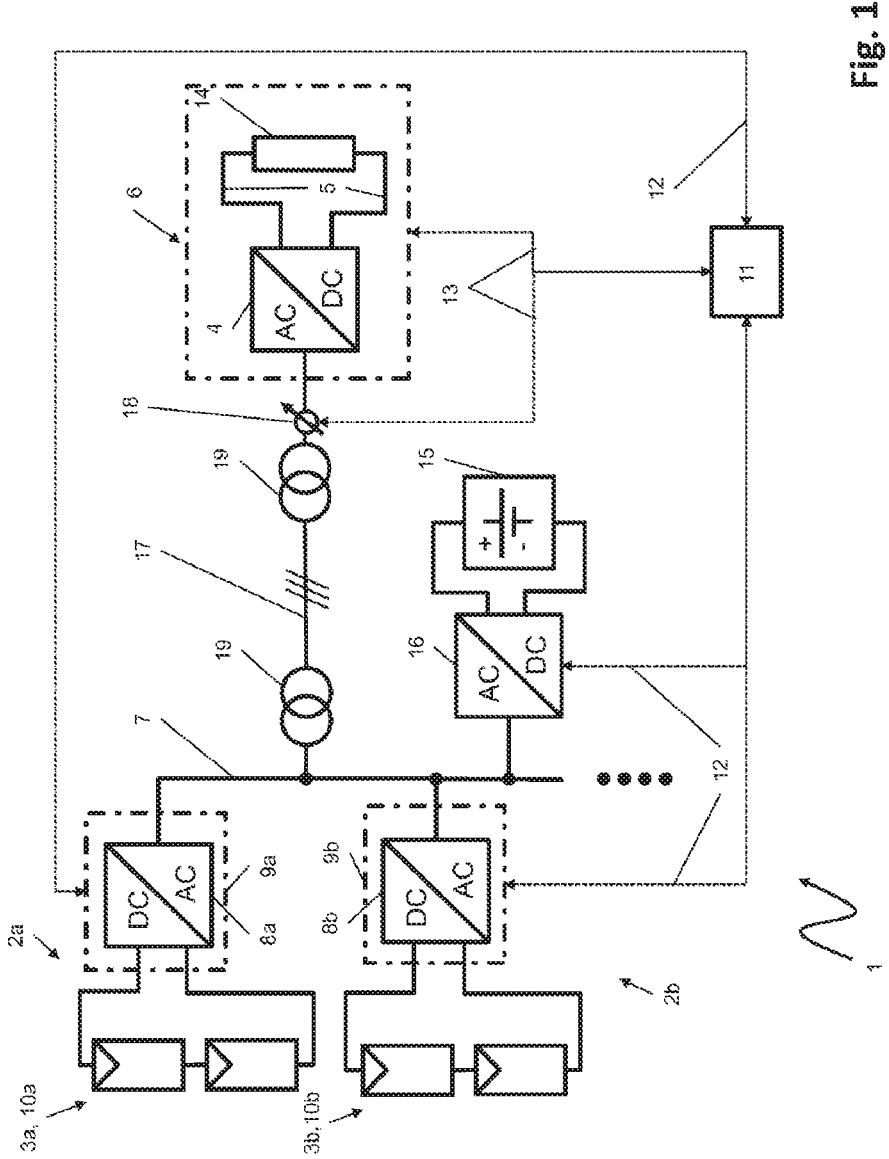
FIG. 1 shows an embodiment of an island system according to the disclosure.

FIG. 1 illustrates an embodiment of the island system 1 according to the disclosure. The island system 1 has two power generating units 2a, 2b that are connected to an AC conductor 7 of the island system 1. Each of the power generating units 2a, 2b is embodied in the form of a photovoltaic (PV) system with a photovoltaic (PV) generator 10a, 10b as a power source 3a, 3b and a voltage-controlling converter 9a, 9b connected thereto. The converter 9a, 9b is each configured to control an AC voltage according to a frequency-power characteristic curve stored in the respective converter 9a, 9b. To this end, each of the converters 9a, 9b has a DC/AC converting module 8a, 8b. Further, the island system 1 contains a load 6 in the form of a DC load 14, for example an electrolyzer, which is connected to the AC conductor 7 of the island system 1 by way of an AC/DC converting module 4. The island system 1 furthermore comprises a high-voltage conductor 17, which is connected to the AC conductor 7 by way of transformers 19. A control unit 11 for controlling the voltage-controlling converters 9a, 9b is connected to the latter by way of control and communication links 12, illustrated using dashed lines, by means of which the control unit 11 also transfers the default value of the voltage amplitude $\hat{U}_0$ to the group of converters 9a, 9b. Furthermore, the control unit 11 is connected via control and communication links 13, illustrated using dashed lines, to a detection unit 18 for detecting a frequency $f_2$ and, optionally, a voltage amplitude $\hat{U}_0$ of an AC voltage in the island system 1. The detection unit 18 and the load 6 are also controlled by way of this control and communication link 13.

A group of two power generating units 2a, 2b is illustrated in example fashion in FIG. 1. However, the group may also contain only one power generating unit or more than two power generating units. A DC/DC converting module (not illustrated in FIG. 1), more particularly a step-up converter, may be disposed upstream of the DC/AC converting module 8a, 8b of each converter 9a, 9b. The island system 1 is illustrated in example fashion as being three-phase; this is illustrated schematically by the three oblique dashes within the high-voltage conductor 17. However, the island system 1 being able to have a different number of phase conductors also lies within the scope of the disclosure. Furthermore, an energy store in the form of a battery 15 is connected to the AC conductor 7 of the island system 1 by way of a bidirectionally operable current controlling AC/DC converting module 16. In conjunction with the AC/DC converting module 16, the energy store facilitates buffering of short-term variations in the power of the regenerative power sources 3a, 3b without necessarily adapting the voltage amplitude $\hat{U}_0$ of the AC voltage and hence the power consumed by the load. This can be advantageous, particularly for a load 6 with a slow reaction. However, the energy store and also the bidirectional AC/DC converting module 16 connected therewith represent only optional components of the island system according to the disclosure, the existence of said optional components not being mandatory.

Figure 2:
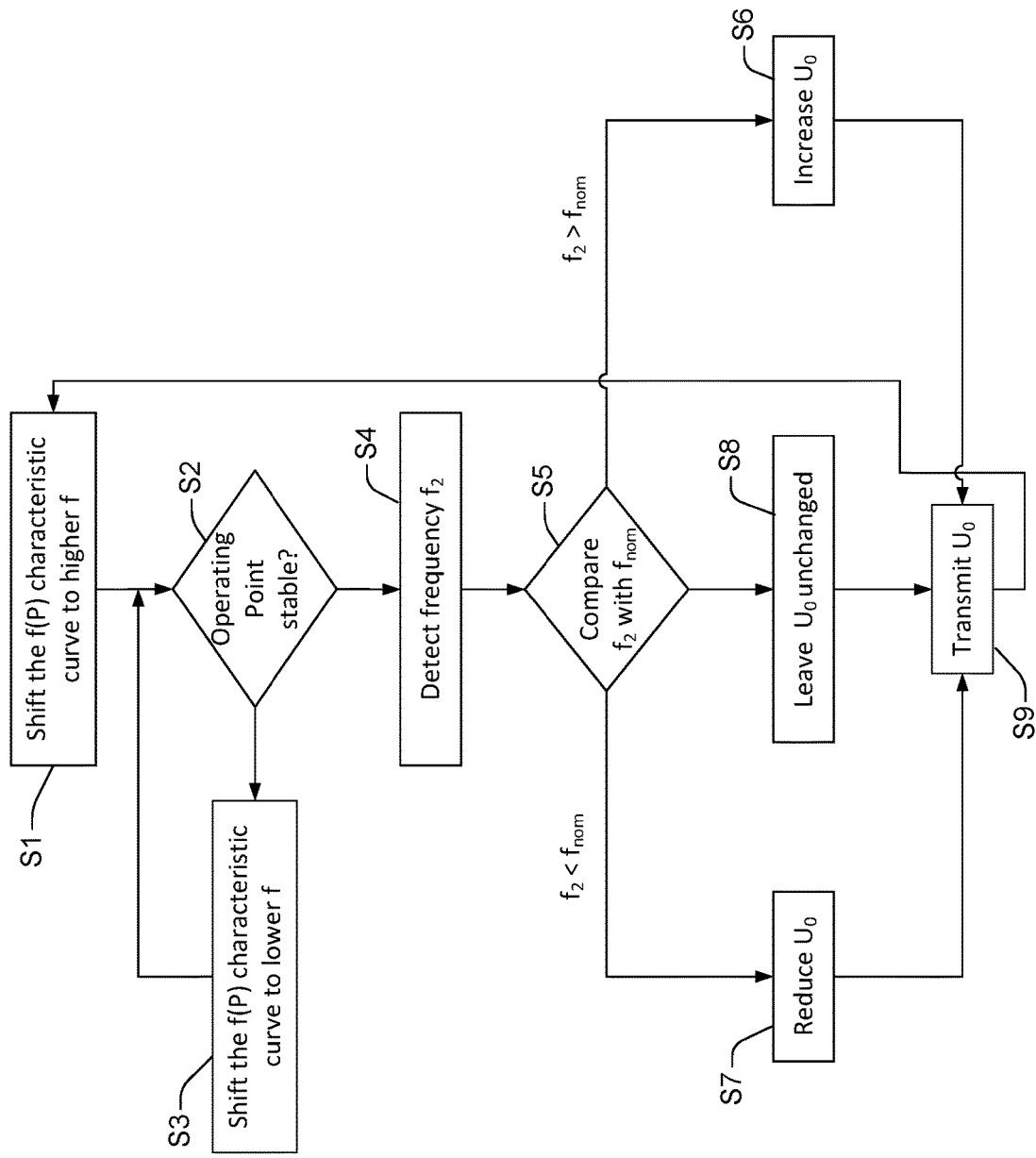
FIG. 2 shows a flowchart of an embodiment of the method according to the disclosure.

FIG. 2 shows a flowchart of an embodiment of the method according to the disclosure for operating the island system 1 of FIG. 1. The method proceeds from a stable operating point of all converters 9a, 9b and the power sources 3a, 3b connected thereto, the regenerative power sources 3a, 3b being able to yield the powers associated with the nominal frequency $f_{nom}$ according to the frequency-power characteristic curve stored in the converters 9a, 9b at said operating point. The AC voltage in the island system 1 initially has the voltage amplitude $\hat{U}_0$ and the nominal frequency $f_{nom}$. In the first act S1, the frequency-power characteristic curve of a converter 9a of the group of voltage-controlling converters 9a, 9b is shifted to a higher frequency at the same power in order to check whether the power source 3a associated with the converter 9a has more power available than the current power. Shifting the frequency-power characteristic curve of the one converter 9a to higher frequency at the same power leads to the corresponding converter 9a supplying a higher power, at least in the short term, while the other converter 9b accordingly supplies less power. Consequently, there is at least a short-term change in the power distribution $P_a/P_b$ of the two converters 9a, 9b with initially the same overall power $P_a+P_b$. At S2, a check is carried out as to whether the power source 3a of the one converter 9a has the higher power associated with the modified frequency available in accordance with its frequency-power characteristic curve, or, expressed differently, whether the modified operating point is a stable operating point. By way of example, the check can be carried out by detecting a voltage at a DC link circuit associated with the converter 9a. Should the voltage at the DC link circuit collapse and drop below a threshold, the method assumes that the energy source 3a does not have the corresponding power available. The operating point of the power generating unit 2a made of power source 3a and converter 9a is not stable, and the method branches to S3, where the frequency-power characteristic curve is shifted to a lower frequency at the same power $P_a$. Once again, a check is carried out at S2 whether a stable operating point of the one converter 9a and the energy source 3a connected thereto now is present. The loop of method acts S2 and S3 is run through until the operating point remains stable, i.e., the voltage across the DC link circuit associated with the one converter 9a does not collapse and, more particularly, does not drop below a threshold. In this case, the method assumes that a stable operating point is present and the method branches to act S4, in which the frequency $f_2$ of the AC voltage in the island system 1 is detected. In the subsequent act S5, a check is carried out by way of a comparison of the detected frequency $f_2$ to the nominal frequency $f_{nom}$ as to whether the detected frequency $f_2$ is greater than, less than or equal to the nominal frequency $f_{nom}$ of the AC voltage. If the detected frequency $f_2$ is greater than the nominal frequency $f_{nom}$, the default value of the voltage amplitude $\hat{U}_0$ is increased by the control unit 11 at S6. By contrast, if the detected frequency $f_2$ is less than the nominal frequency $f_{nom}$, the default value of the voltage amplitude $\hat{U}_0$ is reduced at S7. In the case where the detected frequency $f_2$ equals nominal frequency $f_{nom}$, the default value of the voltage amplitude $\hat{U}_0$ remains unchanged at S8. Finally, the updated default value of the voltage amplitude $\hat{U}_0$ is transferred to the group of converters 9a, 9b from the control unit 11 at S9. As a result of this step, the overall power $P_a+P_b$ and hence the power Last $P_{Last}$ to be consumed by the load is varied in the island system 1. As explained in conjunction with FIGS. 3a and 3b, or FIGS. 4a and 4b, this simultaneously makes the frequency $f_2$ approach the nominal frequency $f_{nom}$. The method ends at step S9 and it can be carried out again later, starting with the act S1. In one embodiment the method described using the example of the one converter 9a runs parallel in time, but independently of one another, in each of the two converters 9a, 9b. In this way, a change of the maximum available power of both power generating units 2a, 2b is tracked over time and the power $P_{Last}$ consumed by the load 6 is thus updated such that, where possible, the maximum available power of both energy generating units $P_a+P_b$ is always generated and picked off.

FIG. 3a and FIG. 3b illustrate an embodiment of the method in which the frequency-power characteristic curve 20a of the one converter 9a is modified by way of a shift parallel to the frequency axis fa. The frequency-power characteristic curves 20a, 20b of both converters 9a, 9b are illustrated in the form of straight lines in example fashion. As an alternative thereto, however, each of the frequency-power characteristic curves 20a, 20b may also be described by a different monotonically decreasing function. In a first state 25, the converters 9a, 9b of the island system 1 are at an operating point 23 within the frequency-power diagram, said working point being determined by point of intersection of the two frequency-power characteristic curves 20a, 20b. The AC voltage of the island system 1 has the nominal frequency $f_{nom}$ and the voltage amplitude $\hat{U}_0$ in the first state 25. In the first state 25 the one converter 9a supplies a power $P_{a,25}$ and the other converter supplies a power $P_{b,25}$. Both powers $P_{a,25}$, $P_{b,25}$ and the sum thereof $P_{ges,25}$, $P_{a,25}+P_{b,25}$ are sketched schematically in FIGS. 3a and 3b. Now, the frequency-power characteristic curve 20a of the one converter 9a is shifted parallel to the frequency axis to higher frequency at the same power. The shift by a value of $\Delta f_{0,a}$ is likewise labeled by an arrow in FIGS. 3a and 3b. Following the shift, a new frequency-power characteristic curve 20a arises for the converter 9a; it is illustrated using a dash-dotted line in FIGS. 3a and 3b. The modified frequency-power characteristic curve 20a has a new point of intersection with the frequency-power characteristic curve 20b of the other converter 9b. This new point of intersection defines a new operating point 23, which is adopted in a second state 26 that follows the first state 25. In the second state 26, there has been a change in the powers $P_{a,26}$, $P_{b,26}$ of the individual converters 9a, 9b but not in the overall power $P_{ges,26}=P_{a,26}+P_{b,26}$ thereof. The modified powers $P_{a,26}$, $P_{b,26}$ of the individual converters 9a, 9b and also their overall power $P_{ges,26}$ in the second state 26 are illustrated schematically by arrows in FIGS. 3a and 3b. Even though the overall power $P_{ges,26}$ in the second state 26 equals the overall power $P_{ges,25}$ in the first state 25, the overall power $P_{ges,26}$ in the second state 26 is now transported within the island system 1 at a frequency $f_2$ that is higher in comparison with the nominal frequency $f_{nom}$. The modified frequency $f_2$ of the second state 26 is measured by the control unit 11 in conjunction with a detection unit 18. The higher frequency $f_2$ allows a deduction that the group of converters 9a, 9b in conjunction with the connected power sources 3a, 3b has a higher overall power available than the current overall power $P_{ges,26}$. As a reaction thereto, the default value of the voltage amplitude $\hat{U}_0$ in the island system 1 is increased by the control unit 11. The increased default value is transmitted to the group of converters 9a, 9b by the control unit 11, as a result of which the overall power $P_{ges},27=P_a,27+P_b,27$ of the group of converters 9a, 9b increases in a third state 27 following the second state 26. In the third state 27, the common operating point 23 of the converters 9a, 9b emerges once again from the point of intersection of the two frequency-power characteristic curves 20a, 20b. It is evident from FIG. 3b that the common operating point 23 in the third step 27 once again has the nominal frequency $f_{nom}$ of the AC voltage in the island system 1. However, the frequency-power diagrams of both converters 9a, 9b have moved apart, corresponding to an increased overall power $P_{ges},27=P_a,27+P_b,27$ of the two converters 9a, 9b. The third state 27 is illustrated in FIG. 3b with the corresponding powers $P_a,27$, $P_b,27$ of the individual converters 9a, 9b and the arising overall power $P_{ges},27$.

FIGS. 3a and 3b only schematically sketch out a modification. The illustrated modification is repeated after certain times, in regular fashion in one embodiment, such that a change over time in the respectively available power of the at least one power generating unit 2a comprising the at least one converter 9a and the power source 3a connected thereto is tracked. Moreover, the change of the frequency-power characteristic curve 20a, described above using the example of the converter 9a, is also implemented parallel in time in the other converter 9b, with the frequency-power characteristic curve 20b thereof also being modified accordingly. Here, parallel in time does not mean that each partial step of the method runs at the same times in the individual converters. Rather, parallel in time in this case means that the method acts overall are implemented parallel in time in both converters 9a, 9b, without individual method acts necessarily always having to be implemented at the same time in both converters 9a, 9b in the process. Consequently, a change in time of the respective available power is also tracked for the respective other converter 9b in conjunction with the power source 2b attached thereto. In this way, the power $P_{Last}$ consumed by the load 6 is always updated to the respectively available power $P_{ges}=P_a+P_b$ of the group of converters 9a, 9b. In FIGS. 3a and 3b, the overall power $P_{ges}$ is increased by a shift in the frequency-power characteristic curves 20a, 20b to a higher frequency at a given power. In a manner analogous thereto, there is a reduction in the overall power $P_{ges}$ by virtue of the frequency-power characteristic curves 20a, 20b being shifted to a lower frequency at a given power.

FIG. 4a and FIG. 4b schematically illustrate a second embodiment of the method. The graphs illustrated in FIGS. 4a and 4b are similar to the diagrams already illustrated in FIGS. 3a and 3b in terms of many features, which is why the description of the figures of FIGS. 3a and 3b is referred to in respect of the explanations relating to said features. Therefore, the explanation below relates predominantly to the differences of FIGS. 4a and 4b with respect to the FIGS. 3a and 3b, which have already been described above.

In a manner analogous to FIG. 3a, FIG. 4a illustrates the frequency-power characteristic curves 20a, 20b assigned to the respective converters 9a, 9b in two f(P) diagrams situated next to one another. Each of the two frequency-power characteristic curves 20a, 20b is embodied in the form of a straight line. An individual straight slope $\alpha_a$, $\alpha_b$ is assigned to each frequency-power characteristic curve 20a, 20b. In a first state 25, a common operating point 23 of the two voltage-controlling converters 9a, 9b emerges from the point of intersection of the two frequency-power characteristic curves 20a, 20b. In contrast to the embodiment of FIGS. 3a and 3b, the frequency-power characteristic curve 20a of the one converter 9a is now not repositioned by way of a shift parallel to the frequency axis but, however, by way of a change (in this case: increase) in the straight-line slope $\alpha_a$. In this way too, a new operating point 23 of the two converters 9a, 9b arises in a second state 26 that follows the first state 25, with, relative to the first state 25, an initially still unchanged overall power $P_{ges,26}=P_{ges,25}$, where $P_{ges,25}=P_{a,25}+P_{b,25}$ and $P_{ges,26}=P_{a,26}+P_{b,26}$. Here, too, the operating point 23 in the second state 26 is characterized by a frequency $f_2$ of the AC voltage of the island system 1 lying above the nominal frequency $f_{nom}$. The frequency $f_2$ is measured by way of the control unit 11, optionally in conjunction with the detection unit 18, and compared to the nominal frequency $f_{nom}$. Since the measured frequency $f_2$ in the example lies above the nominal frequency $f_{nom}$, this is interpreted as meaning that more power is available than the power $P_{ges,26}=P_{a,26}+P_{b,26}$ currently produced by the power generating unit 2a, 2b. Accordingly, a new default value of the voltage amplitude $\hat{U}_0$ is then transmitted to the group of converters 9a, 9b by the control unit 11. By virtue of the converters 9a, 9b now controlling an AC voltage with a greater voltage amplitude $\hat{U}_0$, there also is an increase in the power $P_{Last}$ consumed by the load 6 and an increase in the distance between the two diagrams, as illustrated in FIG. 4b. Here, an operating point 23 that once again has the nominal frequency $f_{nom}$ of the AC voltage of the island system 1 arises in the third state 27 that follows the second state 26. However, the power $P_{a,27}$ supplied by the one converter 9a in conjunction with the connected power source 3a—and hence also the overall power $P_{ges,}27=P_a,27+P_b,27$—in the third state 27 has increased relative to the first state 25 and relative to the second state 26.

The disclosure can likewise be carried out in equivalent fashion using a monotonically increasing frequency-power characteristic curve associated with the converters, wherein the voltage amplitude $\hat{U}_0$ is then lowered when the nominal frequency $f_{nom}$ is exceeded and increased when said nominal frequency is undershot. Accordingly, the characteristic curve is also shifted to lower frequencies in sections in order to check the availability of a higher power, or the characteristic curve is shifted to higher frequencies in sections when the power associated with the characteristic curve cannot be obtained. This variant should be understood to be an equivalent embodiment of the disclosure and is contemplated as falling within the scope of the present disclosure. However, for improving the understandability and for reasons of conciseness of the claims and the description, only the variant corresponding to the phrasing of the claims was explained in more detail.

The invention claimed is:

1. A method for operating an island system, the island system comprising
    a group of voltage-controlling converters, wherein each of the voltage-controlling converters of the group is configured to convert power of respectively connected regenerative power sources into AC power in accordance with a respective frequency-power characteristic curve,
    a load having a power consumption that depends on a voltage amplitude of an AC voltage of the island system, and
    a control unit that is configured to transmit a default value of the voltage amplitude to the group of voltage-controlling converters,
        wherein the method comprises the following acts for adapting a power to be consumed by the load:
    modifying the frequency-power characteristic curve of at least one of the voltage-controlling converters as a function of an available power of the respective regenerative power source,
        wherein the frequency-power characteristic curve is modified, at least in sections, to a higher frequency at a given power in order to check whether the available power of the regenerative power source lies above the current power, and
        wherein the frequency-power characteristic curve is modified, at least in sections, to a lower frequency at a given power if the regenerative power source cannot yield the power associated with the current frequency according to the frequency-power characteristic curve,
    determining a frequency of the AC voltage in the island system as a consequence of the modifying of the frequency-power characteristic curve by the control unit, and
    predetermining a default value of the voltage amplitude and transmitting the redetermined default value to the group of voltage-controlling converters by means of the control unit, wherein the default value is increased if the determined frequency lies above a nominal frequency, and wherein the default value is reduced if the determined frequency lies below the nominal frequency.

2. The method as claimed in claim 1, further comprising, prior to increasing the default value of the voltage amplitude:
    performing a check as to whether a power flowing through the at least one voltage-controlling converter exceeds, or threatens to exceed, a power limit thereof, wherein the default value of the voltage amplitude is not increased if the power limit will be exceeded with an increased default value of the voltage amplitude, or
    performing a check as to whether the power consumption of the load exceeds, or threatens to exceed, a maximum admissible power consumption of the load, wherein the default value of the voltage amplitude is not increased if the maximum admissible power consumption of the load will be exceeded with an increased default value of the voltage amplitude.

3. The method as claimed in claim 2, further comprising ascertaining the power limit of the corresponding voltage-controlling converter on the basis of maximum permitted current and/or voltage values of the voltage-controlling converter.

4. The method as claimed in claim 2, further comprising adapting the power to be consumed by the load in the case of known values of the power limit of the converter, of the regenerative power source associated with the converter and/or of the maximum admissible consumption $P_{max,Last}$ of the load in such a way that
the power flowing through the at least one voltage-controlling converter lies by at least one preset tolerance value below the power limit of the corresponding voltage-controlling converter and/or of the regenerative power source associated with the converter, or
a power consumption of the load lies by at least one preset tolerance value below the maximum admissible consumption of the load.

5. The method as claimed in claim 1, further comprising measuring a voltage value at a DC link circuit associated with the corresponding voltage-controlling converter during a check as to whether the regenerative power source can yield the power associated with the current frequency according to the frequency-power characteristic curve.

6. The method as claimed in claim 5, further comprising signaling that the regenerative power source is unable to yield the power associated with the current frequency according to the frequency-power characteristic curve if the measured voltage value drops below a voltage threshold.

7. The method as claimed in claim 1, wherein the modifying of the frequency-power characteristic curve includes a parallel displacement of at least one section of the frequency-power characteristic curve in a direction parallel to the frequency axis.

8. The method as claimed in claim 1, wherein the frequency-power characteristic curve is described by a straight line in at least one section thereof, wherein the change in the frequency-power characteristic curve includes a change in a straight-line slope in the at least one section.

9. The method as claimed in claim 1, wherein the group contains a multiplicity of voltage-controlling converters, which are each configured to convert power of connected regenerative power sources into AC power in accordance with a frequency-power characteristic curve, and wherein the modification of the frequency-power characteristic curve as a function of the available power of the power source associated with the converter is implemented for each individual converter.

10. The method as claimed in claim 1, wherein the acts of adapting the power to be consumed by the load are performed repeatedly in order to track a change of the maximum available power of the regenerative power source over time or in order to track a power limit of the corresponding converter over time.

11. An island system, comprising:
a group of voltage-controlling converters each comprising a DC/AC converting module, wherein the input of each voltage-controlling converter is connected to a respective regenerative power source and an output thereof is connected to an AC conductor of the island system,
wherein each of the voltage-controlling converters is configured to control an AC voltage in the island system as a function of a frequency-power characteristic curve associated with the respective voltage-controlling converter,
a load having a power consumption that depends on a voltage amplitude of the AC voltage in the island system,
a control unit configured to control the group of voltage-controlling converters, wherein the control unit is configured to transfer to the group a default value of the voltage amplitude for the AC voltage of the island system, and
a detection unit configured to determine a frequency of the AC voltage in the island system, wherein the detection unit is connected to the control unit,
wherein the control unit, in adapting a power to be consumed by the load, is further configured to:
modify the frequency-power characteristic curve of at least one of the voltage-controlling converters as a function of an available power of the respective regenerative power source,
wherein the frequency-power characteristic curve is modified, at least in sections, to a higher frequency at a given power in order to check whether the available power of the regenerative power source lies above the current power, and
wherein the frequency-power characteristic curve is modified, at least in sections, to a lower frequency at a given power if the regenerative power source cannot yield the power associated with the current frequency according to the frequency-power characteristic curve,
determine a frequency of the AC voltage in the island system as a consequence of the modifying of the frequency-power characteristic curve, and
predetermine a default value of the voltage amplitude and transmitting the redetermined default value to the group of voltage-controlling converters, wherein the default value is increased if the determined frequency lies above a nominal frequency, and wherein the default value is reduced if the determined frequency lies below the nominal frequency.

12. The island system as claimed in claim 11, wherein at least one voltage-controlling converter of the group in conjunction with the regenerative power source connected to the respective voltage-controlling converter comprises a photovoltaic (PV) system or a wind power system.

13. The island system as claimed in claim 11, wherein the island system comprises a high-voltage transmission path with a high-voltage conductor, which is connected by way of a transformer to the AC conductor of the island system.

14. The island system as claimed in claim 11, wherein the load comprises a DC load connected via an AC/DC converting module to the AC conductor of the island system.

15. The island system as claimed in claim 11, wherein the island system comprises a storage unit, which is connected to the AC conductor of the island system by way of a bidirectionally operable current controlling DC/AC converting module.

* * * * *